(12) United States Patent
Larson

(10) Patent No.: US 10,348,555 B2
(45) Date of Patent: Jul. 9, 2019

(54) VERSION TRACKING AND RECORDING OF CONFIGURATION DATA WITHIN A DISTRIBUTED SYSTEM

(71) Applicant: Verizon Patent and Licensing Inc., Arlington, VA (US)

(72) Inventor: Eric Larson, Cambridge, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 579 days.

(21) Appl. No.: 15/143,355

(22) Filed: Apr. 29, 2016

(65) Prior Publication Data

US 2017/0317876 A1    Nov. 2, 2017

(51) Int. Cl.
  *H04L 12/24*    (2006.01)
(52) U.S. Cl.
  CPC .................................. *H04L 41/08* (2013.01)
(58) Field of Classification Search
  CPC ....................................................... H04L 41/08
  USPC ....................................................... 709/220
  See application file for complete search history.

(56) References Cited

U.S. PATENT DOCUMENTS

2002/0184340 A1* 12/2002 Srivastava ........ G06F 17/30908
                                                    709/219
2003/0041138 A1*  2/2003 Kampe ............... H04L 41/0893
                                                    709/223

\* cited by examiner

*Primary Examiner* — Vivek Srivastava
*Assistant Examiner* — Sibte H Bukhari

(57) ABSTRACT

Techniques described herein may be used to provide an operator of a network with a current configuration of computing nodes of a distributed system, and processes (e.g., virtual machines) hosted by the computing nodes, and/or a history of changes to the configuration of the computing nodes and/or hosted processes. An operator may cause a computing node, and the processes hosted by the computing node, to be configured based on configuration data stored by a configuration database. Another operator may change the configuration of the computing node, and/or the hosted processes, by changing the configuration data stored by the configuration database. The computing node may create a record of the change. Yet another operator may request that the current configuration of the computing node and the hosted processes (and/or a history of configuration changes to the configuration data) be provided, and the computing node may provide requested information.

20 Claims, 12 Drawing Sheets

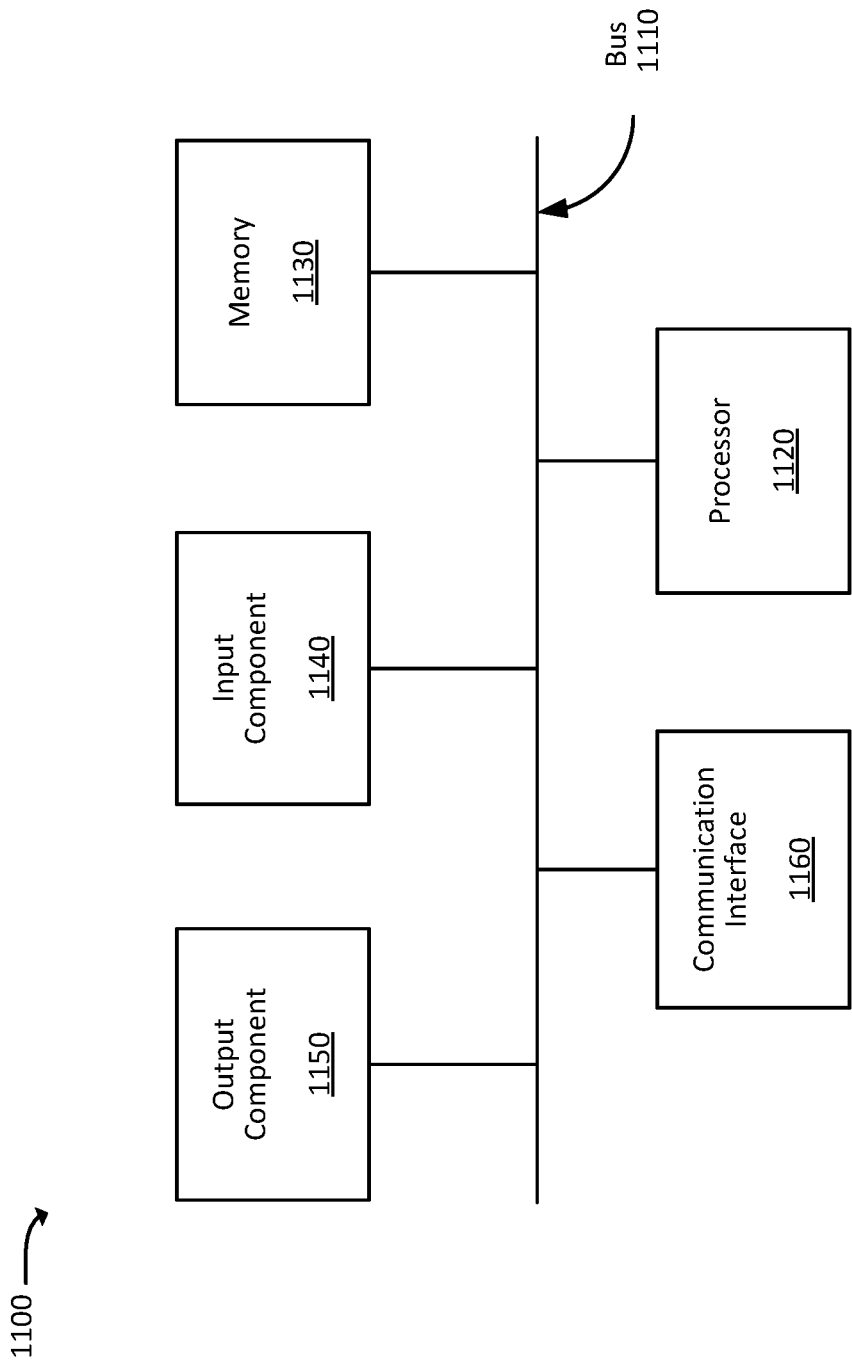

VERSION TRACKING AND RECORDING OF CONFIGURATION DATA WITHIN A DISTRIBUTED SYSTEM

BACKGROUND

Distributed computing systems and/or computer networks, used by businesses or other organizations, may include tens or hundreds of computers. For example, a distributed system may include a number of computing devices (referred to herein as computing nodes), each of which may host one or more processes. A hosted process, as described herein, may be a lightweight virtual machine (VM) that allows code to run in isolation from other hosted processes but safely share the resources of the computing node. Managing such a computing system may include defining the role of each computer/process, defining the software that is to be implemented at the hosted nodes in the computing system, defining the connections between the computing nodes, etc.

Operators (i.e., developers or technicians), when configuring a distributed computing system, may generate configuration files for each hosted process in the distributed system. Each configuration file may define the initialization (e.g., the boot-up process) for a particular hosted process in the distributed system. For a complex distributed system, multiple operators may be responsible for managing the distributed system and may thus each work on the configuration files.

BRIEF DESCRIPTION OF THE DRAWINGS

Embodiments of the present disclosure will be readily understood by the following detailed description in conjunction with the accompanying drawings. To facilitate this description, like reference numerals may designate like structural elements. Embodiments of the disclosure are illustrated by way of example and not by way of limitation in the figures of the accompanying drawings.

FIG. 11 is a block diagram of example components of a device.

DETAILED DESCRIPTION OF PREFERRED EMBODIMENTS

Figure 1:
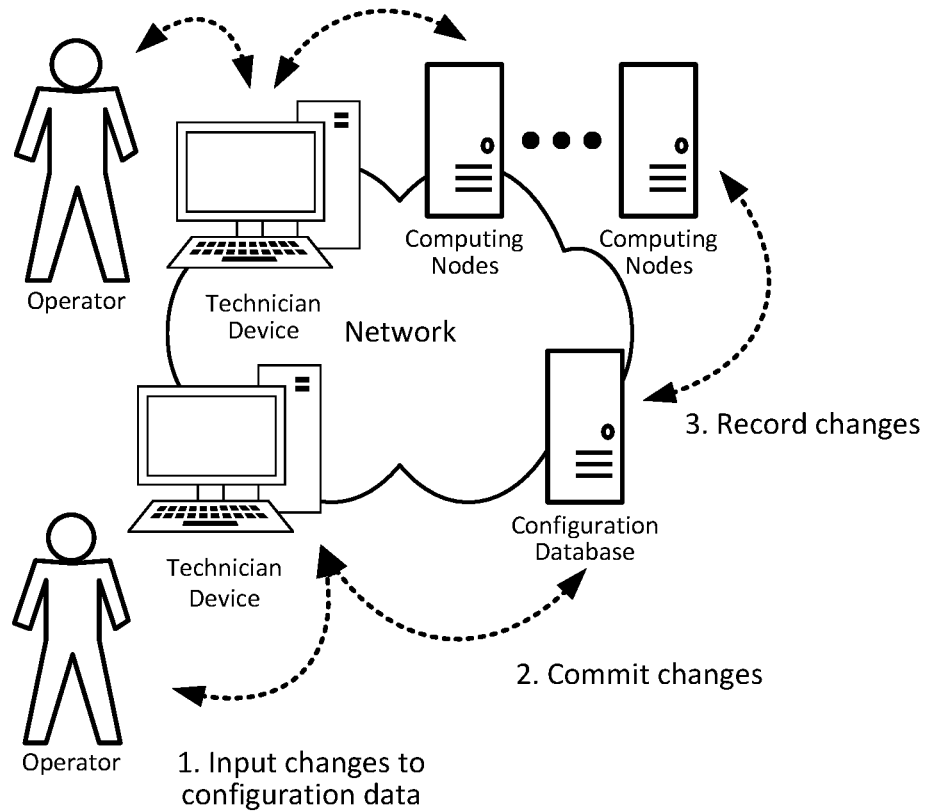
FIG. 1 illustrates an example overview of an implementation described herein.

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the appended claims and their equivalents.

Managing a distributed system can include managing configuration files that define the role of each hosted process, running on computing nodes, in the distributed system. In one implementation, each hosted process may be a lightweight virtual machine (VM) that allows code to run in isolation from other hosted processes but safely share the resources of the computing node. In some implementations, a hosted process may include a software application or service. Various software tools may be used to ensure that the hosted processes are configured appropriately.

For example, the distributed system may include a database that stores information (e.g., a configuration file) about how each hosted process should be configured. The database may include information that indicates how one hosted process should be configured to operate as a network device (e.g., a gateway, a router, etc.), how another hosted process should operate as a storage device, and how other hosted processes may operate to provide a distributed application to end-users.

Techniques described herein may be used to provide operators of the distributed system with information representing a current configuration of the hosted processes within the system and/or a history of changes to the configuration of the hosted processes within the system. For example, the hosted processes within the system may be configured based on the configuration data stored by a data repository (e.g., a database) of the distributed system, and when the configuration data is initially created or changed, a computing node in the distributed system may record the creation or change of configuration data in order to maintain an accurate picture of the overall configuration of the distributed system. Additionally, an operator may request that a history of the configuration changes to the hosted processes in the distributed system be provided, and one or more of the computing nodes in the distributed system may provide the operator with the requested history based on the recorded changes made to the distributed system.

The distributed system may include multiple technician devices (e.g., user computers) that enable different operators to modify the configuration information stored in the database, which may result in a configuration change within the distributed system. At times, a first operator may configure hosted processes in one way, and (unbeknownst to the first operator) a second operator may reconfigure the hosted processes in another way. As such, using the techniques described herein, the first operator may request a record of the current configuration of hosted processes, and/or a history of configuration changes for the hosted processes, in order to, for example, more readily identify (and undo) the configuration changes implemented by the second operator.

FIG. 1 illustrates an example overview of an implementation described herein. As shown, a distributed system may include technician devices (e.g., desktop computers, laptop computers, etc.), computing nodes (e.g., servers), and a data repository (e.g., a database of configuration information). A computing node, as referred to herein, may represent a physical computing device that hosts one or more processes. In one implementation, each hosted process may be a lightweight virtual machine (VM) that allows code to run in isolation from other hosted processes but safely share the resources of the computing node. In one implementation, the CoreOS operating system may be used as the lower level operating system for the computing node. The configuration files discussed herein may apply to the computing node and/or processes hosted by the computing node. For example, a distributed system may include a number of hosted processes, each of which may run as a VM and be associated with a configuration file or set of files. A distributed system may thus include multiple hosted processes that may be executed on multiple computing nodes. Configuration files (potentially including a large number of configuration files), may define the functionality and connectivity (e.g., network connectivity and inter-processes connectivity) of the computing node and/or hosted processes. Examples of the configuration data that may be stored for a computing node may include a name of the computing node, a role of the computing node, a node cluster to which the computing node corresponds, an IP address of the computing node, etc.

An operator of the distributed system may use a technician device (e.g., a physical computer terminal) to make changes to the configuration data (i.e., the set of configuration files) stored by the configuration database (at 1 and 2). A system management process of a computing node may configure computing node, and/or the host processes, based on the configuration information stored by the configuration database. For example, when initializing a hosted process, a computing node may query the database for configuration information and download, install, and/or implement the hosted process based on the configuration information. The computing nodes of the distributed system may implement a revision control program (e.g., the Git management software, the Apache Subversion (SVN) software, etc.) that may provide each computing node with complete access to the configuration data stored by the configuration database. As such, an operator may use any technician device within the network to control the automatic configuration of any of the hosted processes within the distributed system.

Additionally, if/when the configuration data is changed (e.g., by an operator using a technician device), a computing node may record the change to the configuration data (at 3). In some implementations, this may enable an operator to have a complete picture of the current configuration of the overall network. Additionally, this may enable an operator to receive a description (e.g., a history) of the changes to the configuration data over a given period of time. As such, if/when the configuration data for one or more computer nodes and/or hosted processes is inadvertently (or otherwise undesirably) changed, an operator may request information representing the current state of configuration of the computer nodes and hosted processes, and/or a history of the changes to the configuration of the computer nodes and hosted processes, in order to identify the inadvertent configuration change and/or to correct the inadvertent configuration change (at 4).

Figure 2:
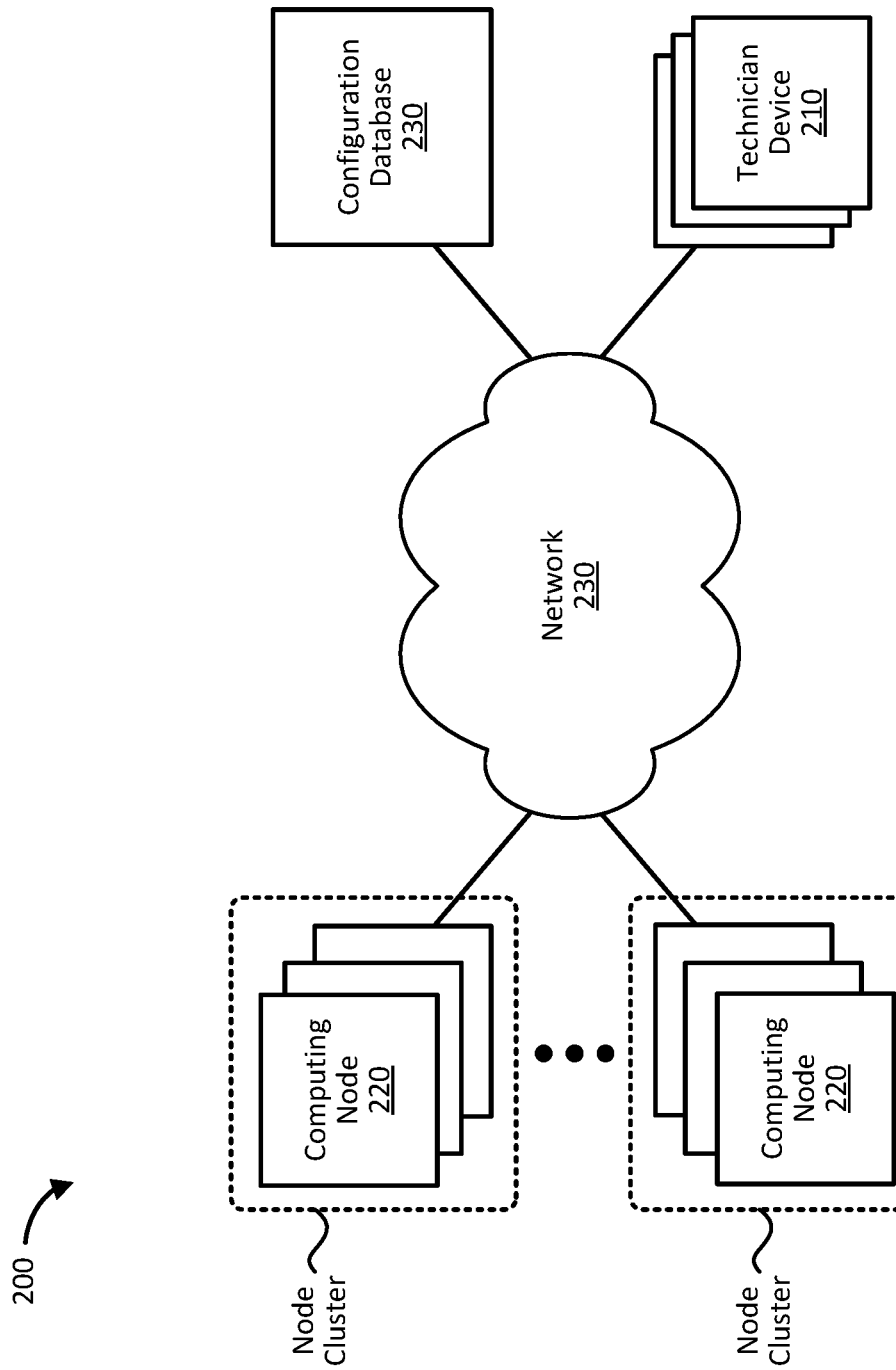
FIG. 2 is a diagram of an example environment in which systems and/or methods described herein may be implemented.

FIG. 2 is a diagram of an example environment 200 in which systems and/or methods described herein may be implemented. Environment 200 may include one or more technician devices, 210, computing nodes 220, configuration database 230, and network 240. In some implementations, environment 200 may be an example of a distributed system as described herein.

The quantity of devices and/or networks, illustrated in FIG. 2, is provided for explanatory purposes only. In practice, environment 200 may include additional devices and/or networks; fewer devices and/or networks; different devices and/or networks; or differently arranged devices and/or networks than illustrated in FIG. 2. For example, while not shown, environment 200 may include devices that facilitate or enable communication between various components shown in environment 200, such as routers, modems, gateways, switches, hubs, etc. Alternatively, or additionally, one or more of the devices of environment 200 may perform one or more functions described as being performed by another one or more of the devices of environments 300. Additionally, the devices of environment 200 may interconnect with each other and/or other devices via wired connections, wireless connections, or a combination of wired and wireless connections. In some implementations, one or more devices of environment 200 may be physically integrated in, and/or may be physically attached to, one or more other devices of environment 200. Also, while "direct" connections are shown in FIG. 2 between certain devices, some devices may communicate with each other via one or more additional devices and/or networks.

Technician device 210 may include a portable computing and communication device, such as a smart phone, a laptop computer, a tablet computer, etc. Technician device 210 may also include non-portable computing devices, such as a desktop computer, a consumer or business appliance, or other devices that have the ability to connect to network 240. Technician device 210 may also include a computing and communication device that may be worn by a user (also referred to as wearable devices) as a watch, a fitness band, a necklace, glasses, an eyeglass, a ring, a belt, a headset, or another type of wearable device.

Technician device 210 may function as a computer terminal for an owner, operator, or administrator of the computer network described in example environment 200. Technician device 210 may be capable of communicating with computing node 220, and/or configuration database 230, via network 250. For example, technician device 210 may change the configuration data stored by configuration database 230. Additionally, technician device 210 may communicate with computing node 220 to receive a description of the current version on configuration data stored by configuration database 230 and a history of changes made to the configuration data.

In one implementation, a distributed system may include multiple technician devices 210, which may enable multiple operators to simultaneously work on a distributed deployment. For example, having multiple technician devices in a distributed system may enable different technicians to collaborate in the management and maintenance of computing nodes 220 and the hosted processes of computing nodes 220. In another example, having multipole technician devices may enable operators to concurrently manage different computing nodes 220 and/or different processes hosted by computing nodes 220.

Configuration data, as described herein, may include information that may cause a particular computing node 220 to automatically configure a hosted process to operate in a manner described by the configuration data. In one example, configuration data may include an identifier (e.g., an application name, a service name, etc.) for each hosted process. Each hosted process may be associated with a key value that indicates a role of the corresponding process. Additionally, each key value may be associated with information and/or instructions for a computing node 220 to automatically download, install, and/or implement software and/or information that may enable the hosted process to operate in accordance with the role indicated by the key value. For example, if the identifier (e.g., the application name, the service name, etc.) of a hosted process is associated with a key value of "application host node," when the particular hosted process reboots, the computing node 220 may automatically access the key value and, in response to the key value, may automatically download, install, and/or implement one or more types of software, software configurations, etc., that enable the hosted process to operate as a host node.

In some implementations, in order to enable the hosted process to operate appropriately within the node cluster, the configuration data (e.g., the key value) associated with a particular hosted process may cause the computing node 220 to retrieve metadata corresponding to one or more other hosted process within the node cluster. For example, the key value "router node" may not only cause a particular computing node 220 to configure a hosted process (e.g., by automatically downloading, installing, and/or executing one or more types of software, software configurations, etc.) to operate as a router. The key value may also cause the computing node 220 to retrieve metadata (e.g., Internet Protocol (IP) addresses, User Datagram Protocol (UDP) ports, etc.) corresponding to another hosted process and/or computing node 220 with which the hosted process 220 is to communicate. As such, an operator may configure and reconfigure a hosted process by associating the hosted process with a particular key value.

Computing node 220 may include one or more computing devices, such as a server device or a collection of server devices, capable of operating in a cloud computing environment. For example, computing node 220 may include a server that includes software (e.g., CoreOS) capable of creating and configuring virtual devices, which may be arranged in different ways and configured to provide different services.

In some implementations, computing nodes 220 may be allocated (or otherwise assigned) to groups that are referred to herein a node cluster. A cluster group may include a logical association between one or more computing nodes 220 (and/or hosted processes) that may have a distinct or stated purpose). In some implementations, a cluster may include a group of computing nodes 220 designated to providing one or more centralized or distributed services to another computing node 220 or other node cluster.

Computing node 220 may be capable of detecting changes to the configuration data stored by configuration database 230 and creating a record of such changes. In some implementations, instead of creating a record of every change to the configuration data, computing node 220 may first determine whether each change is adequately significant to warrant the creation of a record thereof, and may only create records of changes that computing node 220 considers are warranted. For example, computing node 220 may create a record of changes that are substantive in nature (e.g., that would alter the manner in which hosted processes operate). By contrast, computing node 220 may not create a record of changes to configuration data that are cosmetic in nature, such as a change in the format applied to the configuration data, an order in which the configuration data is stored, or another type of change that would not alter the manner in which hosted processes operate.

In some implementations, a particular computing node 220 may receive a request (from an operator via technician device 210) for information representing changes that have been made to the configuration data stored by configuration database 230. In some implementations, the request may specify that the operator is only interested in changes that fall within a particular time frame, within particular versions of the configuration data (e.g., a current version and a version immediately prior to the current version), and/or one or more other constraints. Based on the request, computing node 220 may provide the operator with the requested information (i.e., a current state of the configuration data and/or the changes made to the configuration data).

Configuration database 230 may include one or more computing devices, such as a server device or a collection of server devices, that stores configuration information for hosted processes of computing nodes 220. Configuration database 230 may also receive, and carry out, instructions to change configuration information stored by configuration database 230. In some implementations, the instructions may come from an operator that is using a particular technician device 210. Configuration database 230 may also provide alerts to computing node 220 regarding changes to the configuration data. In some implementations, configuration database 230 may include a database that is distributed across multiple server devices and/or accessible to multiple computing nodes 220. In some implementations, configuration database 230 may include a key value store of a shared configuration-computing environment and may be implemented by ETCd or another type of distributed key value store. In some implementations, the database may include a central database that is accessible by, and includes configuration data for, some or all hosted process of computing nodes 220 in one or more node clusters.

Network 240 may include one or more wired and/or wireless networks. For example, network 240 may include a cellular network (e.g., a second generation (2G) network, a third generation (3G) network, a fourth generation (4G) network, a fifth generation (5G) network, a LTE network, a global system for mobile (GSM) network, a code division multiple access (CDMA) network, an evolution-data optimized (EVDO) network, or the like), a public land mobile network (PLMN), and/or another network. Additionally, or alternatively, network 240 may include a local area network (LAN), a wireless LAN (WLAN), a wide area network (WAN), a metropolitan network (MAN), the Public Switched Telephone Network (PSTN), an ad hoc network, a managed IP network, a virtual private network (VPN), an intranet, the Internet, a fiber optic-based network, and/or a combination of these or other types of networks.

The devices of environment 200 may interconnect with each other and/or other devices via wired connections, wireless connections, or a combination of wired and wireless connections. In some implementations, one or more devices of environment 200 may be physically integrated in, and/or may be physically attached to, one or more other devices of environment 200. Also, while "direct" connections are shown in FIG. 2 between certain devices, some devices may communicate with each other via one or more additional devices and/or networks.

Figure 3A:
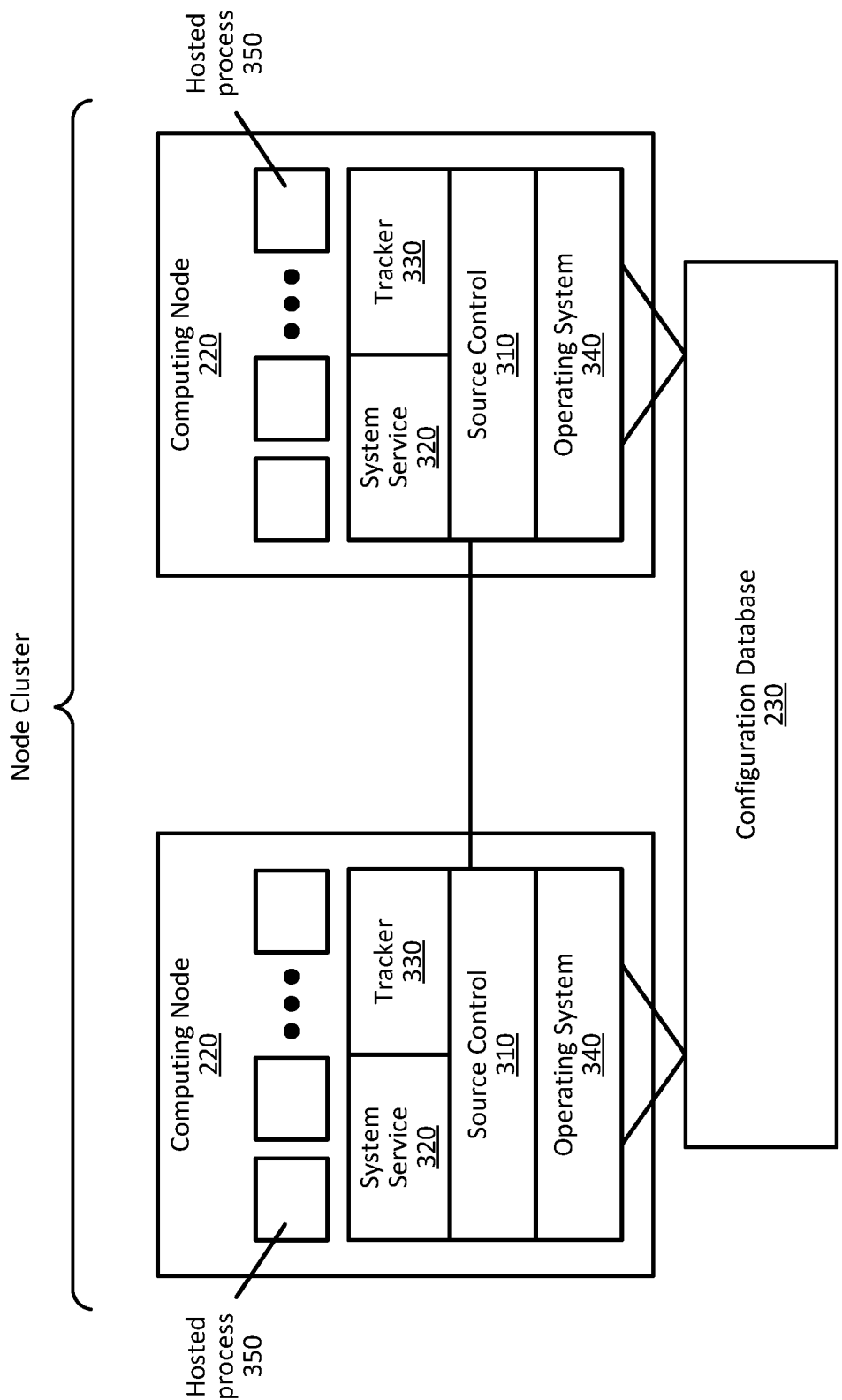
FIG. 3A is a diagram of functional components of computing nodes within a node cluster.

FIG. 3A is a diagram of functional components of computing nodes 220 within a node cluster. As shown, a node cluster may include multiple computing nodes 220 that include several functional components (e.g., source control 310, system service 320 (referred to herein as system management service 320), tracker 330, operating system 340, and one or more hosted processes 350). In addition, each computing node 220 may be connected to a distributed, ubiquitous repository of configuration data (e.g., configuration database 230).

The quantity of functional components, illustrated in FIG. 3A, is provided for explanatory purposes only. In practice, each computing node 220 may include additional functional components; fewer functional components; different functional components; or differently functional components than illustrated in FIG. 3A. In addition, while FIG. 3A illustrates that a single computing node 220 may implement source control 310, system management service 320, and tracker 330, in some implementations, one or more of source control 310, system management service 320, and tracker 330 may be implemented by a separate device or group of devices. Alternatively, or additionally, one or more of the functional components of FIG. 3A may perform one or more functions described as being performed by another one or more of the functional components of FIG. 3A.

Source control 310 may enable computing node 220 to maintain an accurate picture of the configuration data stored by configuration database 230 and a history of changes made to the configuration data. For example, as operators change the configuration data stored by a data repository 230, source control 310 may receive (via tracker 330) a record of the changes, and may cause the record to be stored along with a time (e.g., a timestamp) of when the changes were made. Source control 310 may include a revision control program that may include, or be based on, the Git management software. For example, source control 310 may represent a single client instance of the Git management software, and may operate with other instances of source control 310 (e.g., implemented at other computing nodes 220) to provide a distributed revision control program.

At some point, a particular computing node 220 may receive a request from an operator (e.g., via a particular technician device 210) for information describing the changes that have been made to the configuration data in configuration database 230. And in response, computing node 220 may provide the operator with a history of changes to the configuration data. As such, source control 310 may enable computing node 220 to make a complete accounting of the changes made to the configuration data stored by any data repository 230.

As shown in FIG. 3A, each computing node 220 may include an instance of source controller 310. In other implementations, source controller 310 may only be implemented by one computing node 220 or certain computing nodes 220. For example, since source control 310 may receive records of configuration data changes via tracker 330, in some implementations, source controller 310 may only be implemented by computing nodes 220 that also include an instance of tracker 330.

System management service 320 may include a system initialization tool capable of controlling distributed processes that are executed by computing node 220. For example, system management service 320 may enable computing node 220 to retrieve (e.g., from data repository 230) a key value associated with an identifier of hosted processes 350 of computing node 220. System management service 320 may also retrieve and implement configuration data (which may include a key value associated with an identifier) for the computing node 220. Additionally, or alternatively, system management service 320 may enable computing node 220 to configure a hosted process 350 based on a key value associated thereto (e.g., which may include automatically download, install, and/or implement software and/or configuration information associated with the key value). In some implementations, system management service 320 may include one or more functionalities of an operating system utility (e.g., a utility (e.g., systemctl) of the Linux operating system, the CoreOS operating system, or another operating system). In some implementations, system management service 320 may include a software application (or another type of software) installed on an operating system of computing node 220.

Tracker 330 may enable computing node 220 to listen for changes to the configuration data of configuration database 230. For example, tracker 330 may be configured to listen for (e.g., receive) indications form configuration database 230 of changes to the configuration data. In one example, tracker 330 may enable computing node 220 to request that configuration database 230 notify computing node 220 of changes that are made to certain types of configuration data (e.g., node IDs, key values, etc.) stored by configuration database 230. In some implementations, tracker 330 may do so by registering a callback with configuration database 230. In some implementations, the callback may include a command line tool (e.g., an etcdctl tool) capable of listening for changes to a database (e.g., ETCd) implemented by configuration database 230. Additionally, or alternatively, in response to a change in the configuration data of configuration database 230, tracker 330 may retrieve information, describing the change, from configuration database 230, create a record of the change in accordance with a preselected format (also referred to herein as a "canonical format"), and provide the record of the change to source control 310. In some implementations, tracker 330 may be implemented by the device associated with the configuration database.

Operating system 340 may include an operating system installed on computing node 220. Operating system 340 may include a lower level operating system for computing node 220, upon which hosted processes 350 (e.g., VMs) may be built. Operating system 340 may also support services and utilities (such as source control 310 system management service 320, and tracker 330) that are typically constant and not rebooted. In one implementation, operating system 340 may include CoreOS or another type operating system that provides an infrastructure to distributed and/or clustered deployments.

Figure 3B:
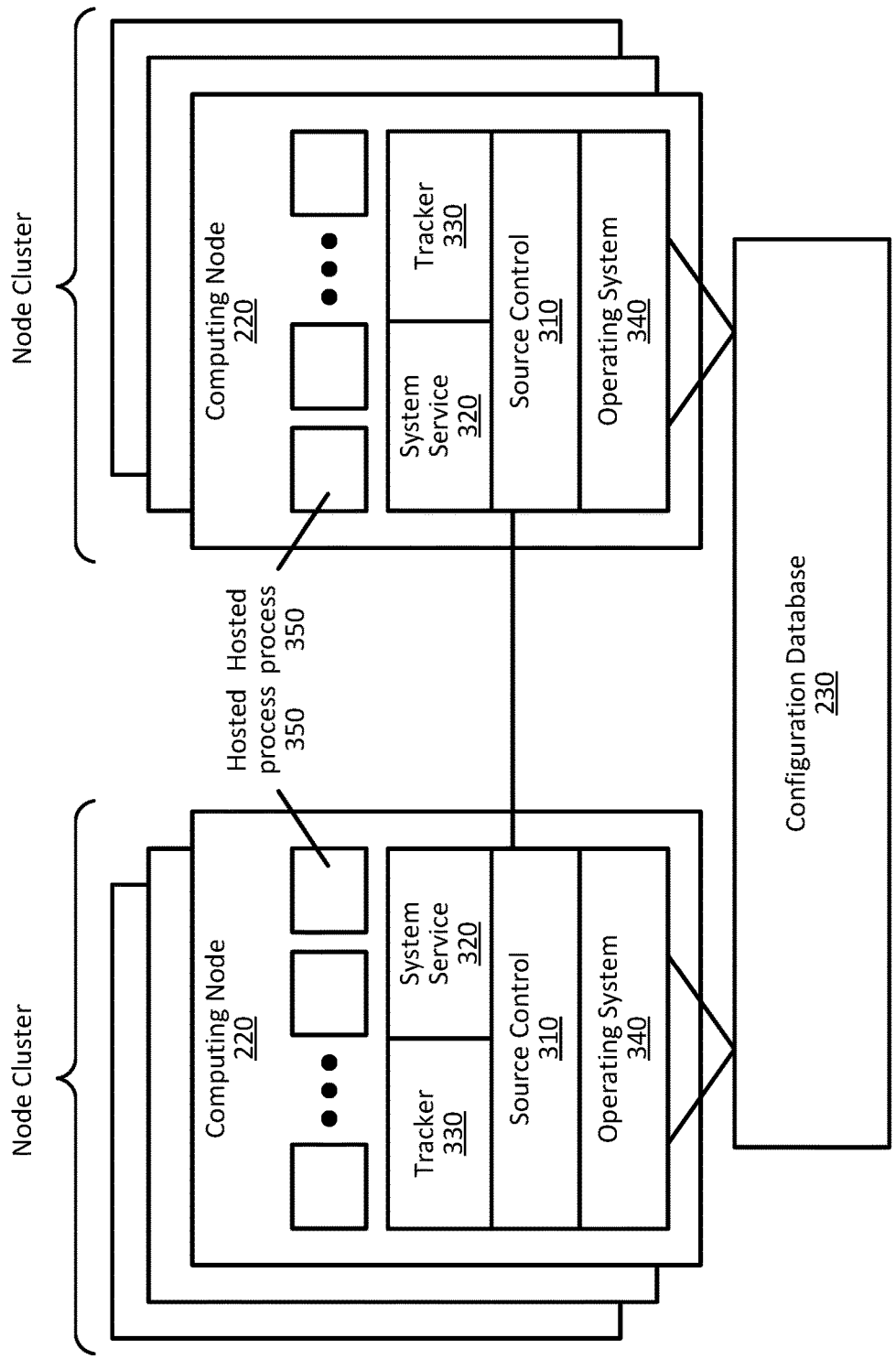
FIG. 3B is a diagram of functional components of computing nodes within multiple node clusters.

FIG. 3B is a diagram of functional components of computing nodes 220 within multiple node clusters. As shown, one or more computing nodes 220 within each node cluster may include an instance of source control 310, system service 320 (referred to herein as system management service 320), tracker 330, operating system 340, and one or more hosted processes 350, the functions of which are described above.

In some implementations, the node clusters may be dedicated to different software development projects (e.g., to the development of different software programs that are completely independent of one another. In other implementations, the node clusters may be dedicated to the development of different aspects (e.g., features, utilities, functions, etc.) of the same software program. Nevertheless, as described above, each computing node 220, of each node cluster, may include an instance of source control 310, which may include a revision control program (such as the Git management software). And, as described above, the revision control program may provide each computing node 220 with complete access and control of the information stored by a distributed, ubiquitous data repository (e.g., configuration database 230), which may include the configuration data allocating computing nodes 220 into the node clusters.

Figure 4:
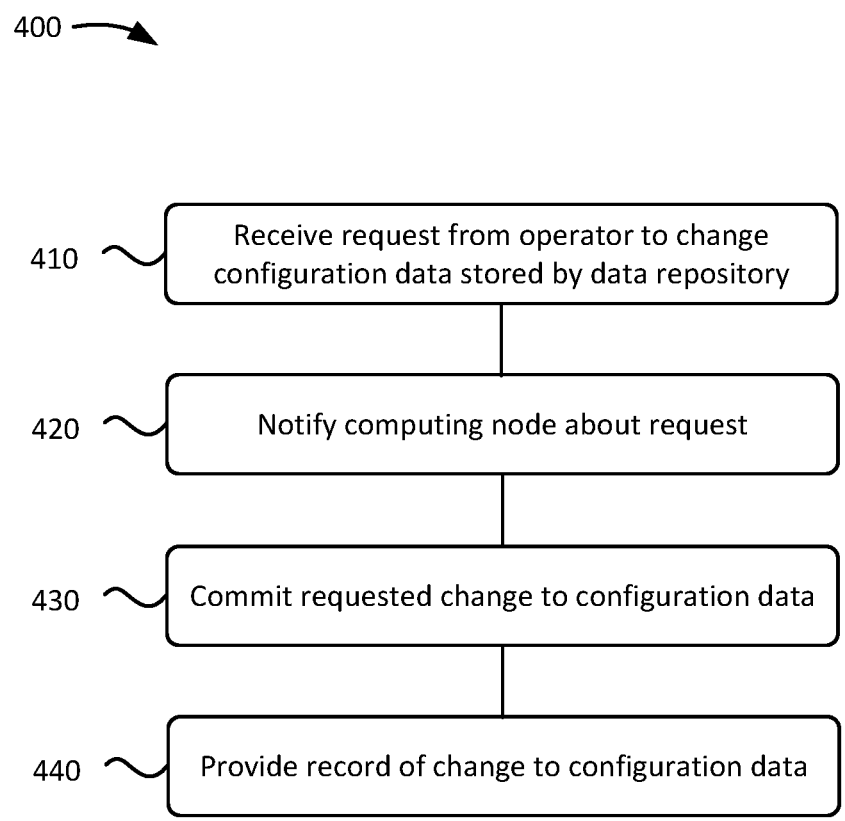
FIG. 4 is a flowchart diagram of an example process for automatically creating a record of a change to the configuration data stored by a configuration database.

FIG. 4 is a flowchart diagram of an example process 400 for automatically creating a record of a change to the configuration data stored by a data repository 230. In some implementations, process 400 may be implemented by technician device 210 and/or configuration database 230. In some implementations, process 400 may include fewer, additional, and/or alternative operations than those depicted in FIG. 4. For example, in some implementations, process 400 the operations corresponding to blocks 420 and 440 may be combined into a single operation of notifying computing node 220 of changes made to the configuration data stored.

As shown, process 400 may include receiving a request from an operator to change configuration data stored by data repository 230 (block 410). For example, configuration database 230 may receive a request, via technician device 210, may from an individual (such as an operator, a developer, etc.). The request may be to change (e.g., add/edit/delete) some of the configuration data stored by configuration database 230. As mentioned above, the configuration data may include an identifier (which may correspond to a particular hosted process 350 of computing node 220) and a key that is logically associated with the identifier. The key may indicate the manner in which a hosted process, corresponding to the identifier, should operate.

Process 400 may also include notify computing node 220 about request (block 420). For example, configuration database 230 may communicate with computing node 220 to indicate that a request to change the configuration data has been received. In some implementations, configuration database 230 may, instead, notify computing node 220 after the request to change the configuration data has already been implemented (i.e., after the configuration data has been changed).

Process 400 may also include committing the requested change to the configuration data (block 430). For example, configuration database 230 may update the configuration data stored by configuration database based on the request to change the configuration data. Depending on the request, this may include adding new configuration data stored by configuration database 230, altering configuration data stored by configuration database 230, and or deleting configuration data stored by configuration database 230.

Process 400 may also include providing a record of the change to the configuration data (block 440). For example, configuration database 230 may inform computing node 220 about the changes made to the configuration data stored by configuration database 230. In some implementations, this may include providing computing node 220 with an image or another type of representation of the current configuration data. In some implementations, this may include providing computing node 220 with a copy of the current configuration data itself. In some implementations, instead of creating a copy of all of the configuration data stored by configuration database 230, the record may be limited to indicating the actually changes to the configuration data (e.g., the identifiers and keys that were added, changed, or deleted). In some implementations, configuration database 230 may provide the configuration data in response to a request, from computing node 220, to do so. In some implementations, the configuration database 230 may be configured so that changes to certain data (e.g., certain field within the database (such as field that could affect the configuration of a hosted process)) may cause configuration database 230 to send a copy of the changes to any tracker so registered (via a fallback function).

Figure 5:
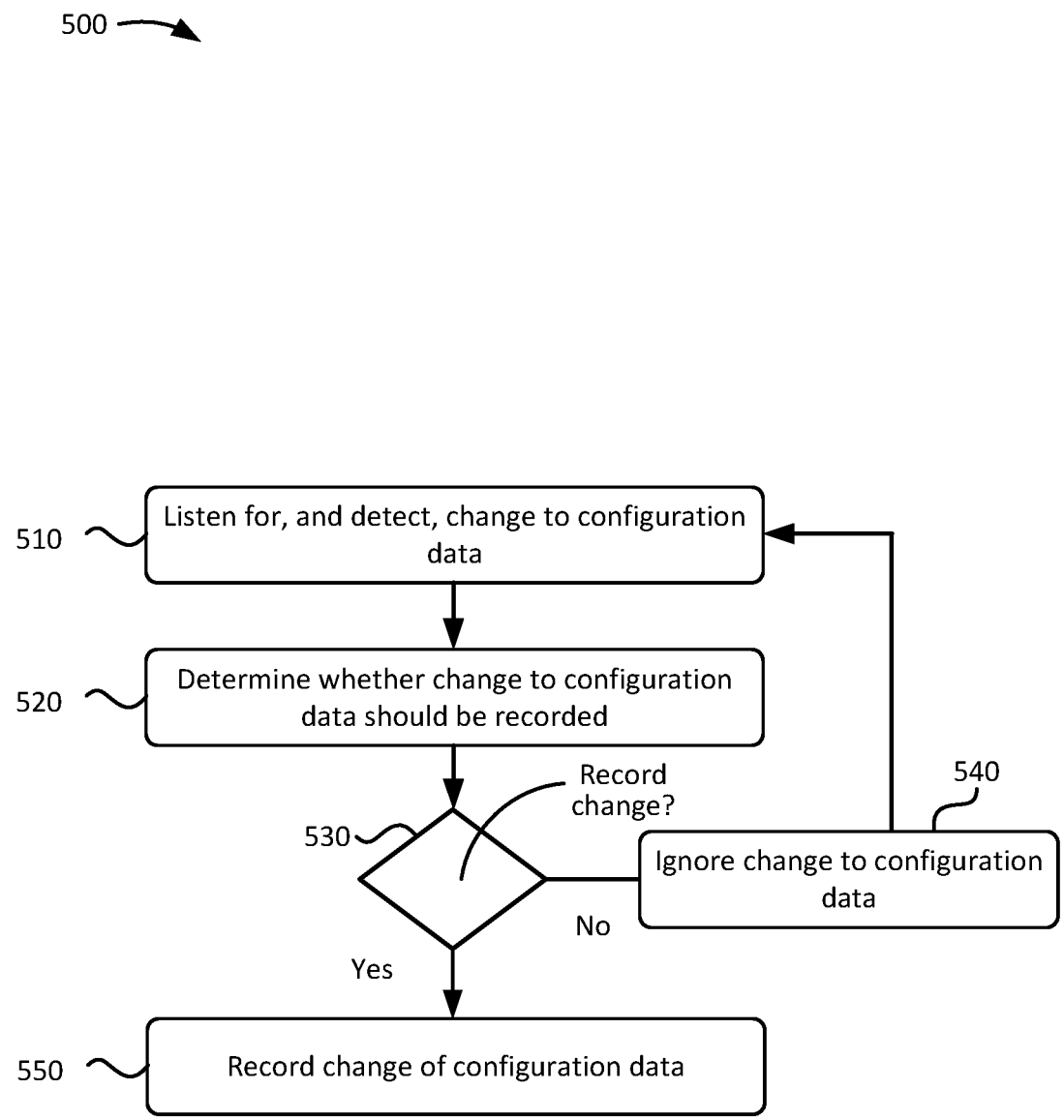
FIG. 5 is a flowchart diagram of an example processing configuration changes received from the configuration database.

FIG. 5 is a flowchart diagram of an example process 500 for processing configuration changes received from the configuration database. In some implementations, process 500 may be implemented by computing node 220, and may involve one or more of the functional components (e.g., source control 310, system management service 320, and tracker 330) described above with reference to FIG. 3A. FIG. 5 is described below with reference to FIGS. 6 and 7.

As shown, process 500 may include listening for, and receiving, a change to configuration data (block 510). For example, computing node 220 (e.g., via tracker 330) may register with configuration database 230, such as by registering a callback function with database 230, to receive notifications of changes to the configuration data stored by configuration database 230. After registering with the configuration database 230, computing node 220 may listen for notifications from configuration database 230 about changes to the configuration data. As such, if or when configuration database 230 receives instructions (e.g., from technician device 210) to change the configuration data, configuration database 230 may notify the registered computing node 220 of the change to the configuration data.

In some implementations, the notification from configuration database 230 may provide information about the change to the configuration data. For example, configuration database 230 may indicate which configuration information is being changed (e.g., which identifier, key, etc.) and/or the values of said configuration information prior (and/or subsequent) to the change. By contrast, in other implementations, configuration database 230 may merely notify computing node 220 that there is a change to the configuration data, and computing node 220 may (in response to the notification) retrieve the details of the change via additional communications.

Process 500 may also include determining whether the change to the configuration data should be recorded (block 530). For example, computing node 220 may analyze the nature of the change to the configuration data and determine whether the change is significant enough to create and store a record of the change. For instance, in some implementations, computing node 220 may determine whether the change to the configuration data would cause one or more hosted processes 350 of computing node 220 to be reconfigured and/or operate in a different manner.

Figure 6:
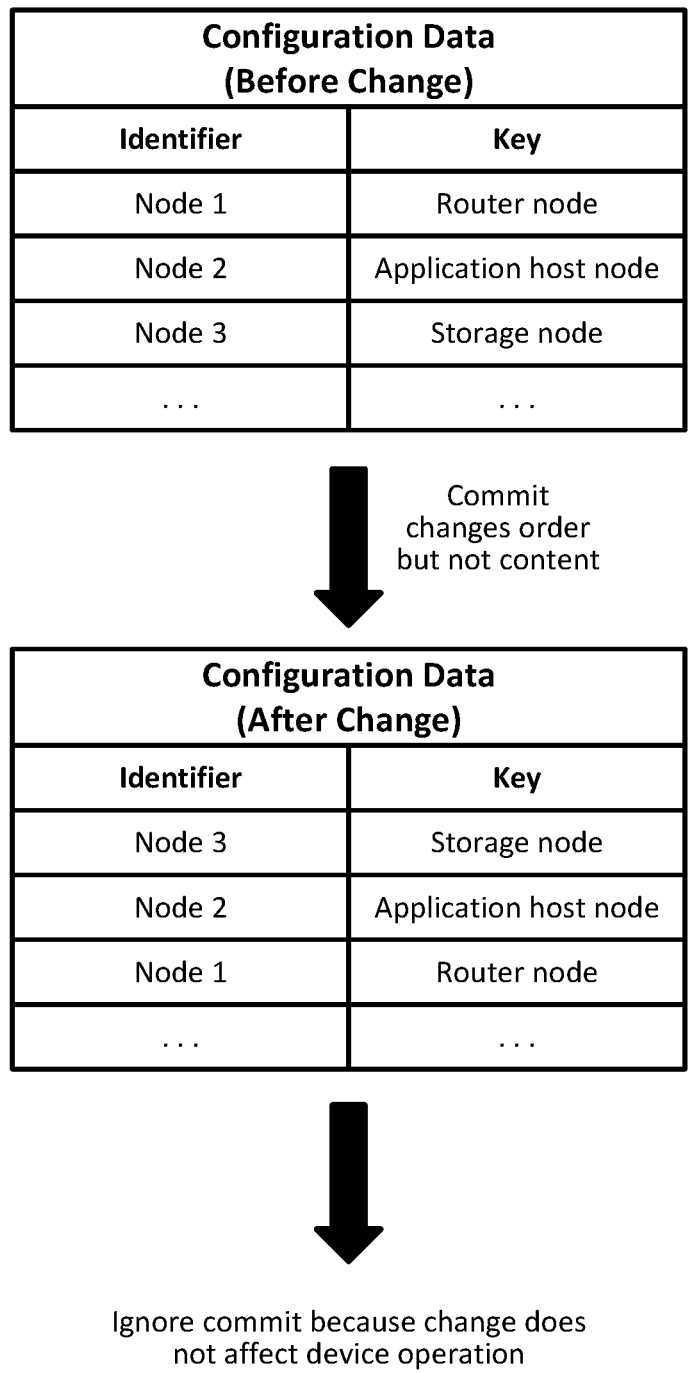
FIG. 6 is a block diagram of an example of a change to configuration data that may not be recorded.

FIG. 6 is a block diagram of an example of a change to configuration data that may not be recorded. As shown, the configuration data stored by configuration database 230 may include a data structure that includes identifiers (e.g., Node 1, Node 2, etc.) that are each associated with a key (e.g., router node, application host node, etc.). As explained above, each identifier may represent a hosted process 350 and each key may cause each hosted process 350 to be automatically configured in a particular way.

For instance, the key may cause computing node 220 to implement a hosted process 350 (e.g., a virtual machine) by downloading, installing, and/or configuring a particular software application in a particular way. As an example, the key of "router node" may cause computing node 220 to download a software application (and router configuration information) that may enable computing node 220 to host a process that operates in a manner that is consistent with that of a virtual router. In addition, computing node 220 may automatically download information corresponding to other hosted processes 350 (e.g., VMs), such as IP addresses, UDP ports, etc. In some implementations, the key may also, or alternatively, cause computing node 220 to disable a hosted processes, which may include uninstalling one or more software applications (and/or delete configuration information corresponding thereto). For example, prior to downloading and installing a new application based on a particular key, computing node 220 may uninstall a software application in order to, for example, make create storage space for a new application. In a similar manner, computing node 220 may also, or alternatively, self-configure based on configuration data (e.g., a key value) retrieved from configuration database 230.

However, a change in configuration data may not always result in a substantive change in the function and operation of hosted processes. For instance, a change in the configuration information may only include an ordering change, a formatting change, or another type of non-substantive change. For example, as shown in FIG. 6, configuration database 230 may change the configuration data by rearranging the order in which configuration data is stored by configuration database 230. Prior to the change, the configuration data entry included an association between Node 1 and Router node, an association between Node 2 and Application host node, an association between Node 3 and Storage node, and so on. Additionally, while the configuration data does, in fact, experience a change, the change may only include a change in the order in which the identifiers, and corresponding keys, are presented. Despite this change, Node 3 is still associated with Storage node, Node 2 is still associated with Application host node, Node 1 is still associated with Router node, and so on. Therefore, since each hosted process 350 may still remain configured in the same manner as before the change, computing node 220 may determine that the change to the configuration data may not need to be recorded.

Figure 7:
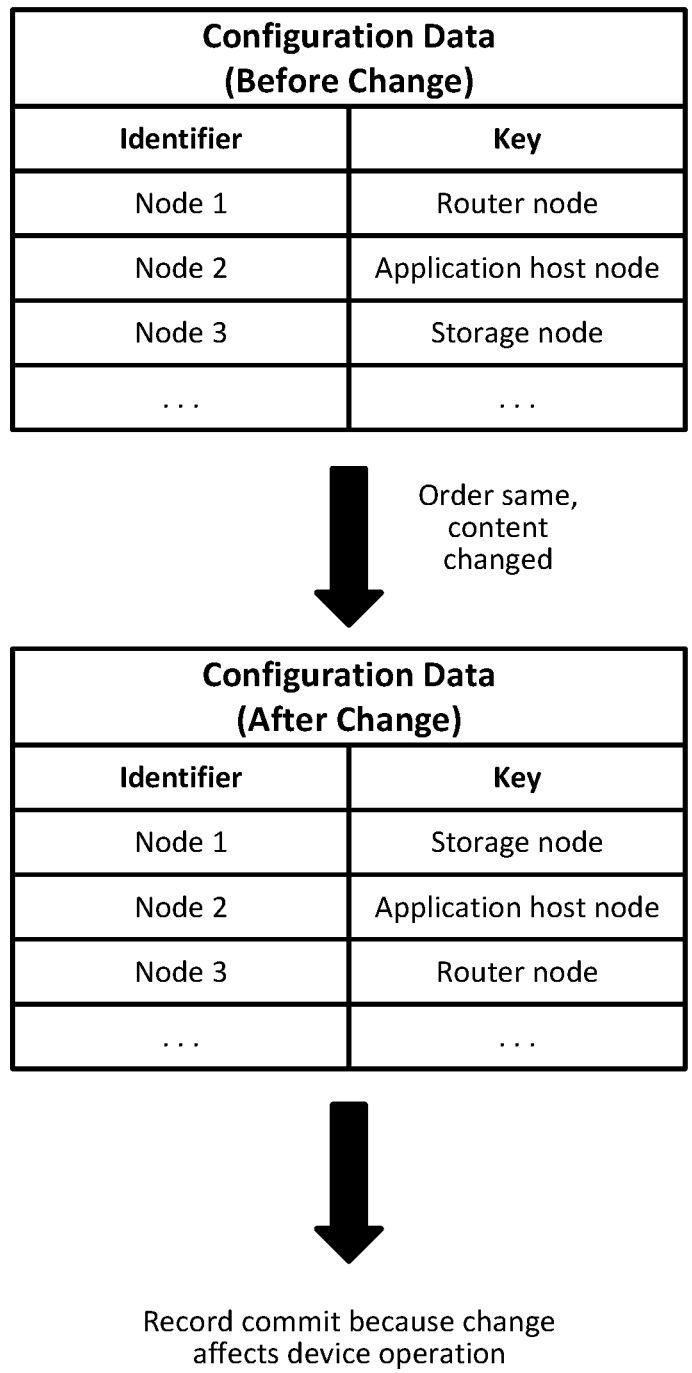
FIG. 7 is a block diagram of an example of a change to configuration data that may be recorded.

FIG. 7 is a block diagram of an example of a change to configuration data that may be recorded. As shown, the configuration data stored by configuration database 230 may include a data structure that includes identifiers (e.g., Node 1, Node 2, etc.) that are each associated with a key (e.g., Router node, Application Host node, etc.). As explained above, each identifier may correspond a particular hosted process 350 and each key may cause computing node 220 to automatically configure the corresponding processes in accordance with the keys.

In contrast to the example discussed above with reference to FIG. 6, the example provided in FIG. 7 includes a scenario where the configuration data is changed in such a manner that may cause a substantive change in one or more hosted processes. For example, before the configuration change, Node 1 is associated with Router node, whereas Node 3 is associated with Storage node. After the change, however, the keys are reversed: Node 1 is associated with Storage node and Node 3 is associated with Router node. This change may cause the corresponding hosted processes 350 to automatically reconfigure and to operate in a different manner. Consequently, computing node 220 may automatically create a record (or otherwise record) the change to the configuration data illustrated in FIG. 7.

Returning to FIG. 5, when it is determined that a change in the configuration data should not be recorded, process 500 may include ignoring the change to the configuration data (block 540). For instance, as described above with reference to FIG. 6, if a change to the configuration data may not have a substantive effect on the hosted processes 350 corresponding to the change, computing node 220 may ignore the change by not creating a record of the change. In some implementations, ignoring non-substantive, cosmetic, or superficial changes to the configuration data may help optimize the performance of computing node 220 by better conserving system resources (e.g., processing capacity, memory capacity, etc.).

By contrast, when it is determined that the change in the configuration data should be recorded, process 500 may include recording the configuration change (block 550). For example, computing node 220 may obtain information representing the change from configuration database 230. As described above, the information may include the affected information before and/or after the change. Alternatively, the information may only include the affected information before the change since, for example, a copy of the affected information may be the current version of configuration stored by configuration database 230. In some implementations, computing node 220 may format the information from the configuration database in accordance with a preselected format (also referred to herein as a "canonical form"). For example, since configuration data stored by configuration database 230 may include many different types of information (e.g., in addition to the information shown in the examples of FIGS. 6 and 7), and since a change in the configuration data may include a change to some of this additional information, placing the information that is received from configuration database 230 into canonical form may include eliminating some of the configuration data involved in the change but that may not be deemed necessary, beneficial, etc., to efficiently creating an accurate history of changes to the configuration data. In some implementations, placing configuration data in a canonical form may include sorting the configuration data, as it is received from configuration database 230, according to an alphabetical order of the keys in the configuration data.

Figure 8:
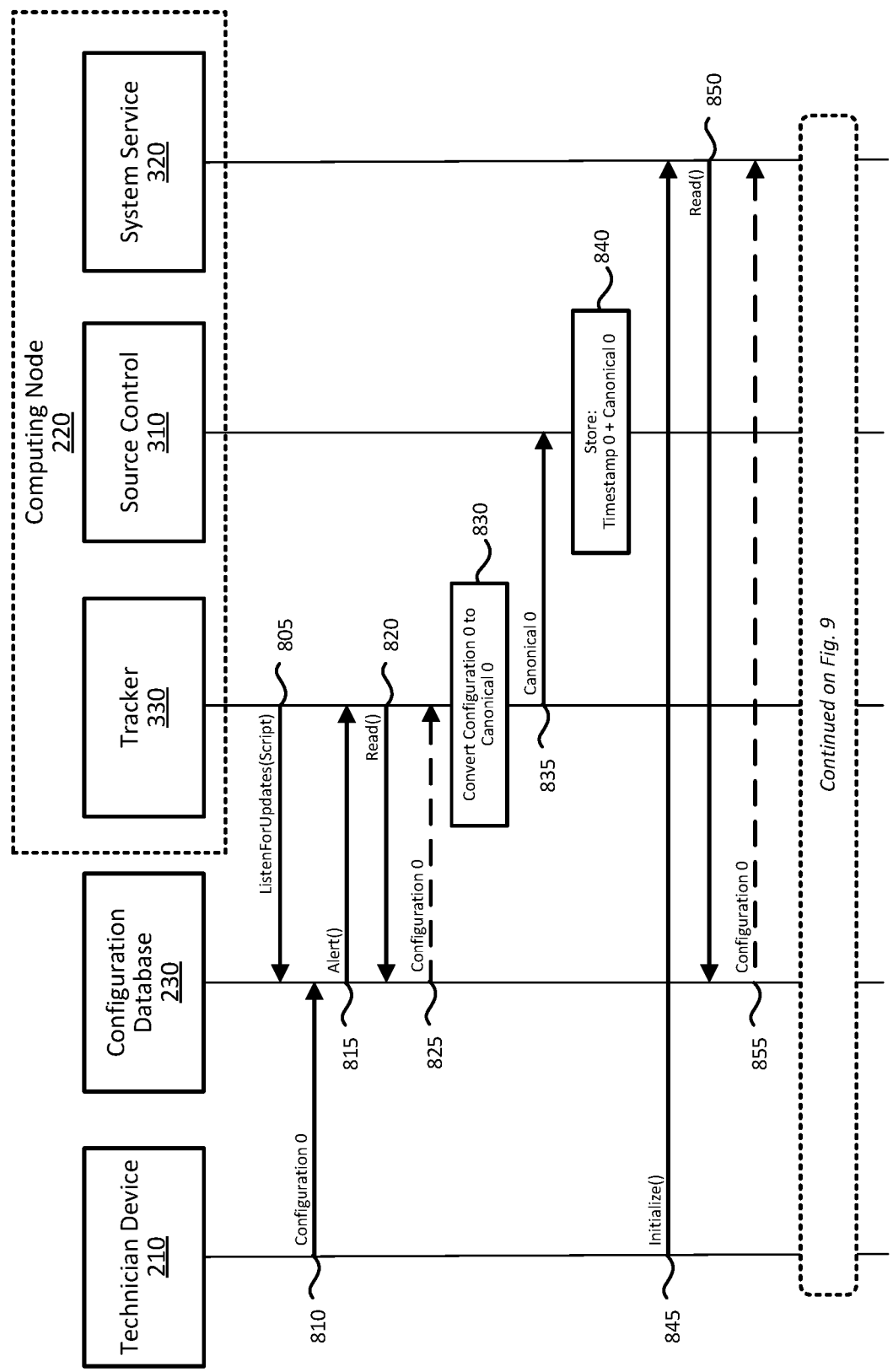
FIGS. 8-10 are flowchart diagrams of an example process for providing an operator with a history of changes to configuration data stored by the configuration database.
Figure 9:
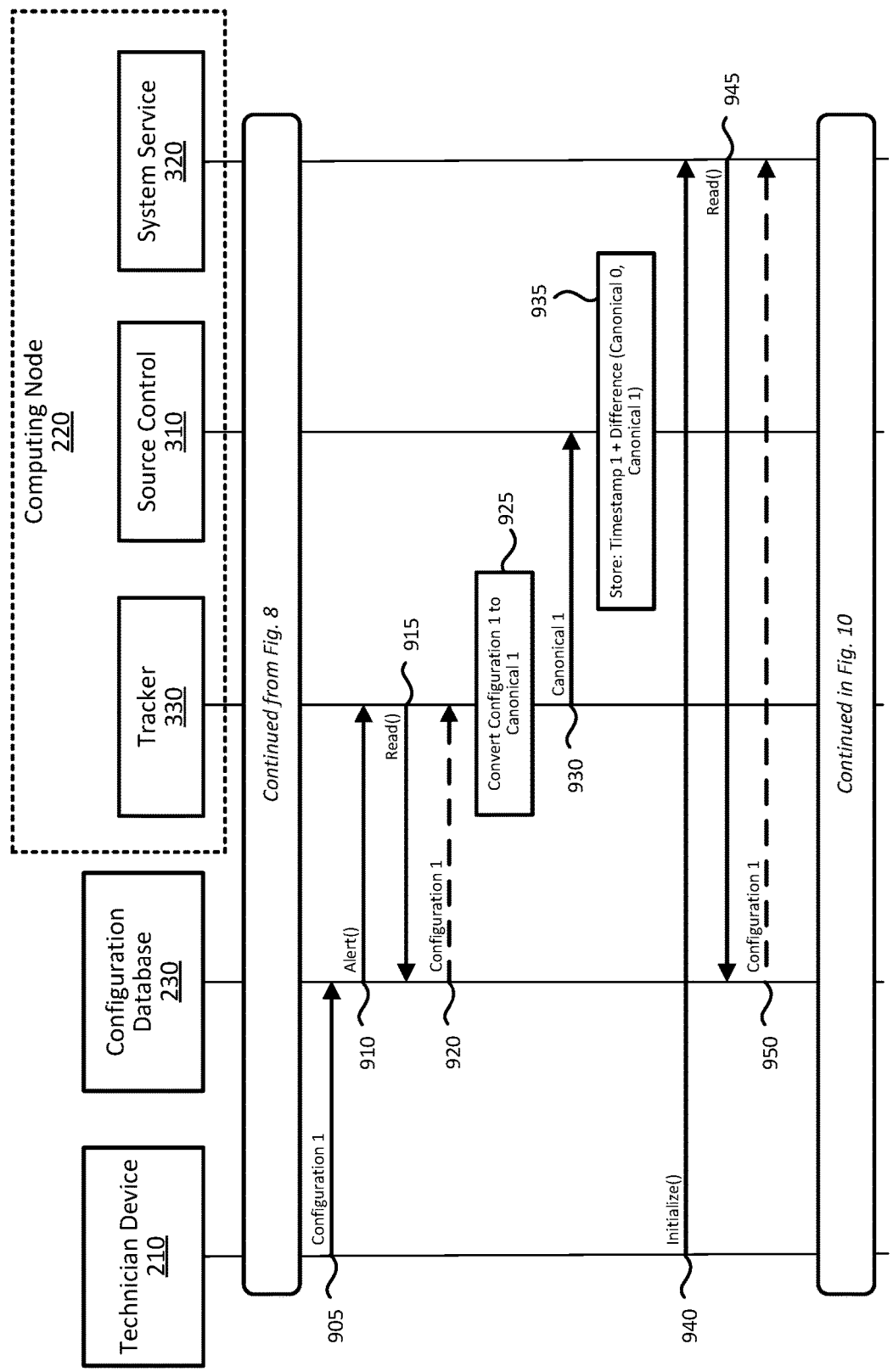
Figure 10:
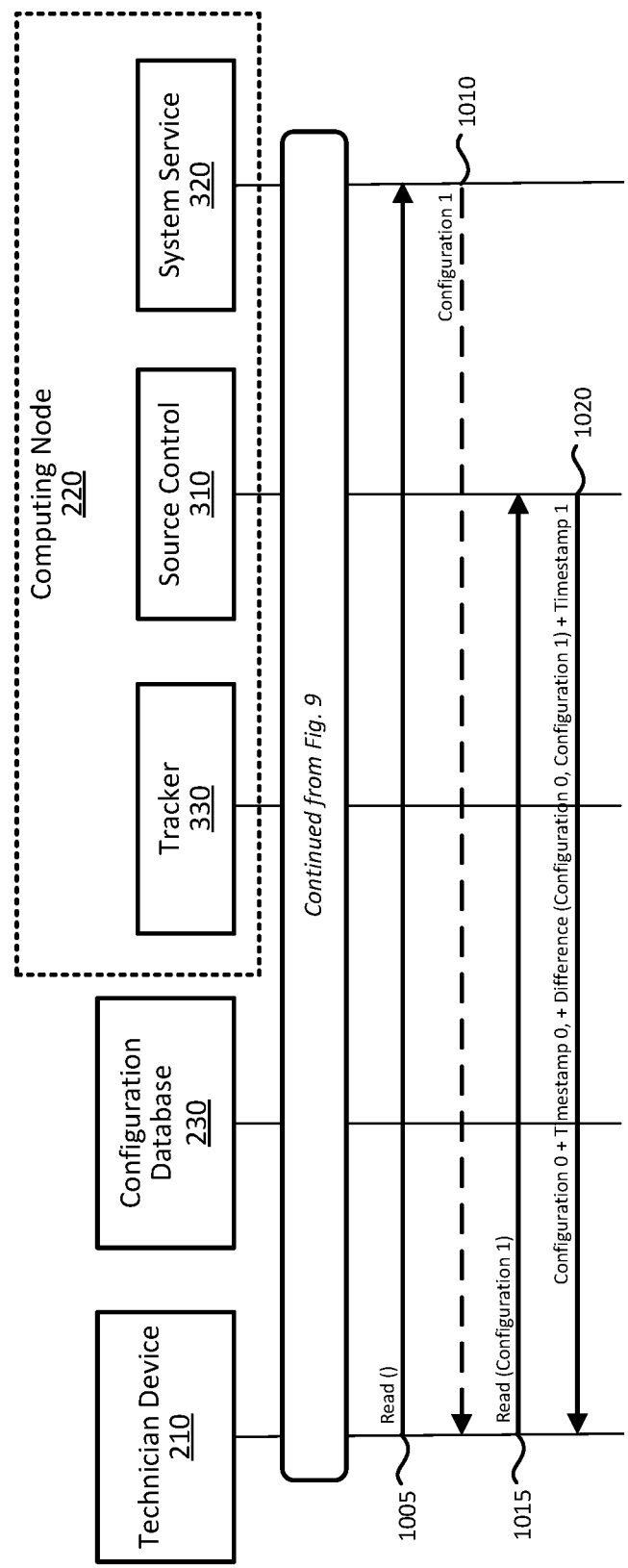

FIGS. 8-10 are flowchart diagrams of an example process for providing an operator with a history of changes to configuration data stored by the configuration database. As shown, FIGS. 8-10 include technician device 210, computing node 220, and configuration database 230, examples of which are discussed above with reference to FIG. 2. As also shown in FIGS. 8-10, computing node 220 may include source control 310, system service 320 (referred to herein as system management service 320), and tracker 330, examples of which are discussed above with reference to FIG. 3A.

The example of FIGS. 8-10 include a series of operations performed by the foregoing devices and device components (e.g., source control 310, system management service 320, etc.). However, the operations, devices, and/or components of FIGS. 8-10 are provided for explanatory purposes only. In practice, the example of FIGS. 8-10 may include additional operations, devices, and/or components; fewer operations, devices, and/or components; different operations, devices, and/or components; or differently arranged operations, devices, and/or components than illustrated in FIGS. 8-10.

As shown in FIG. 8, tracker 330 of computing node 220 may send a request, to configuration database 230, for notifications of any changes that made to configuration data stored by configuration database 230 (line 805). As mentioned above, the configuration data stored by configuration database 230 may include information that may cause computing nodes 220 to automatically configure hosted processes 350 in a particular way (e.g., as a router node, a host node, etc.). Additionally, the request from tracker 330 may include a request for configuration database 230 to register computing node 220 for a notification service provided by configuration database 230. For example, registering computing node 220 for the notification service may cause configuration database 230 to alert tracker 330 each time the configuration data, stored by configuration database 230, is changed.

At some point, an operator, developer, or another person may download, import, and/or input configuration data into technician device 210. Additionally, the operator or developer may send a request, to configuration database 230, to store the newly created configuration data (line 810). Since the request from technician device 210 may include the first time that configuration database is made to store configuration data, as shown in FIG. 8, the configuration data may be annotated as Configuration 0.

Since computing node 220 may be registered to receive notifications of changes in configuration data, the request to store the configuration data may cause configuration database 230 to send an alert message (e.g., Alert( )) to tracker 330 (line 330). In response to the alert message, tracker 330 may send a request (e.g., Read( )) for the configuration data corresponding to the alert message (line 820), which may cause configuration database 230 to provide tracker 330 with the requested information (e.g., Configuration 0) (line 825). Upon reception of the configuration data, tracker 330 may convert the configuration data (e.g., Configuration 0) to a format (annotated in FIG. 8 as Canonical 0) that has been preselected for recording changes to the configuration data. As mentioned above, converting configuration data into a canonical form may include identifying information of interest within the configuration data (e.g., a node cluster ID, a node ID, a key, etc.).

Tracker 330 may communicate the Canonical 0 information to source control 310 (line 835), and in response to receiving the Canonical 0 information, source control 310 may associated the Canonical 0 information with a timestamp of, for example, when the Canonical 0 information was received. Associating the Canonical 0 information with a timestamp may amount to a record representing a change in the configuration data stored by configuration database 230, which may be stored by source control 310 (block 840).

At this point (e.g., after block 840), the configuration data of Configuration 0 may be stored by configuration database 230, and source control 310 may have stored a record of the configuration data (Configuration 0) currently stored by configuration database 230. Technician device 210 may cause system management service 320 to configure one or more hosted processes 350 based on the configuration data (e.g., Configuration 0). For example, technician device 210 may send instructions (e.g., Initialize ( )) to system management service 320 (block 845), that may cause system management service 320 to send a request to configuration database 230 (e.g., via Read( )) for configuration data (block 850). The request from system management service 320 may cause configuration database 230 to provide system management service 320 with a copy of the configuration data (e.g., Configuration 0) currently stored by configuration database 230 (line 855). System management service 320 may use the configuration data to create, delete, and/or configure one or more hosted process 350 (e.g., VMs) of computing node 220.

By way of a summary, at this point, configuration database 230 may be storing a copy of the configuration data (e.g., Configuration 0), and source control 310 may be storing a record of the configuration data stored by configuration database 230. Additionally, technician device 210 may have caused system management service 320 to retrieve the configuration data (e.g., Configuration 0) from configuration database 230, and based on the configuration data, system management service 320 may have created, configured, and/or deleted one or more processes (e.g., VMs) hosted by computing node 220.

Referring now to FIG. 9, technician device 210, configuration database 230, and computing node 220 may perform another sequence of operations that may be similar to those discussed above with reference to FIG. 8. The sequence of operations may be to: 1) change the configuration data stored by configuration database; 2) record the changes to the configuration data; and 3) cause computing node 220 to configure one or more hosted processes 350 based on the configuration data. For example, technician device 210 may provide additional configuration data (e.g., Configuration 1) to configuration database 230 (line 905). Since computing node 220 may have already received a request, from computing node 220, to notify tracker 330 of any changes to the configuration data, configuration database may inform (e.g., via Alert( )) tracker 330 about the updated configuration information (Configuration 1) (line 910).

As shown, this may cause tracker 330 to send a request (e.g., Read ( )), to configuration database 230 for a copy of the new configuration data (e.g., Configuration 1) (line 920). In response, tracker 330 may convert the new configuration data to a canonical form (e.g., Canonical 1) that may have been pre-selected for recording changes to the configuration data stored by configuration database 230 (block 925). Tracker 330 may send the canonical information (e.g., Canonical 1) to source control 310, and source control 310 may create and store a record of the changes to the configuration data. For example, source control 310 may determine the changes corresponding to Configuration 1 by comparing Canonical 0 (received previously at line 835) and Canonical 1. Additionally, source control 310 may associated the resulting difference with a timestamp (e.g., Timestamp 1) representing, for example, the time that corresponds to the change in configuration data (block 935). At this point, therefore, configuration database 230 may have updated the configuration data received previously (e.g., Configuration 0) with the new configuration data (e.g., Configuration 1), and source control 310 may have created a record of the changes to the configuration data stored by configuration database 230.

At some point (e.g., after block 835), technician device 210 may communicate instruction, to system management service 320, to cause system management service 320 to initiate a reconfiguration process (e.g., Initialize 0) (line 940). In response, system management service 320 may send a request (e.g., Read( )), to configuration database 230, for a copy of the current configuration data (e.g., Configuration 1) (block 945). The request from system management service 320 may cause configuration database 230 to provide system management service 320 with a copy of the configuration data (e.g., Configuration 1) (line 950). System management service 320 may use the configuration data to create, delete, and/or configure one or more hosted process 350 (e.g., VMs) of computing node 220.

By way of a summary, at this point, configuration database 230 may be storing a copy of the updated configuration data (e.g., Configuration 1) from technician device 210 and source control 310 may be storing a record of the updated configuration data stored by configuration database 230. Additionally, technician device 210 may have caused system management service 320 to retrieve the configuration data (e.g., Configuration 1) from configuration database 230, and based on the configuration data, system management service 320 may have created, configured, and/or deleted one or more processes (e.g., VMs) hosted by computing node 220.

Referring now to FIG. 10, at some point, the operator or developer may request (e.g., Read( )), via technician device 210, that computing node 220 provide a current version of the configuration data stored by configuration database 230 (line 1005). System management service 320 may respond to the request by providing the current version of the configuration data (e.g., Configuration 1) (line 1010). The operator may also use technician device 210 to request that a history of changes to the configuration data be provided (line 1015). As show, the request may include an indication of the version of the configuration data (e.g., Configuration 1) for which the operator would like to see a history of changes. In some implementations, this request may be a request for a prior version of the configuration data (e.g., Configuration 0 or Canonical 0) and the changes the lead up to the current version of the configuration data (e.g., Configuration 1 or Canonical 1).

Source control 310 may respond to the request by providing technician device 210 with a copy of the previous version of the configuration data (e.g., Configuration 0) (which may include a timestamp associated therewith) and changes to the configuration data, leading up to the current version of configuration data (Configuration 1). In some implementations, the configuration data provided from source control 310 to technician device 210 may be in the form of canonical configuration data.

FIG. 11 is a diagram of example components of a device 1100. Each of the devices illustrated in FIGS. 1, 2, 3A-3B, and 8-10 may include one or more devices 1100. Device 1100 may include bus 1110, processor 1120, memory 1130, input component 1140, output component 1150, and communication interface 1160. In another implementation, device 1100 may include additional, fewer, different, or differently arranged components. As described herein, a component may be implemented by hardware circuitry, software logic, and/or some combination thereof.

Bus 1110 may include one or more communication paths that permit communication among the components of device 1100. Processor 1120 may include a processor, microprocessor, or processing logic that may interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100, such as a keyboard, a keypad, a button, a switch, etc. Output component 1150 may include a mechanism that outputs information to the operator, such as a display, a speaker, one or more light emitting diodes (LEDs), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared (IR) receiver, a cellular radio, a Bluetooth radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1320 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope set forth in the claims that follow. The specification and drawings are accordingly to be regarded in an illustrative rather than restrictive sense.

For example, while a series of lines, arrows, and/or blocks have been described with regard to FIGS. 1, 3, and 5-12 the order of the blocks and arrangement of the lines and/or arrows may be modified in other implementations. Further, non-dependent blocks may be performed in parallel. Similarly, while series of communications have been described with regard to several of the Figures provided herein, the order or nature of the communications may potentially be modified in other implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operations and behaviors of the aspects that were described without reference to the specific software code—it being understood that software and control hardware could be designed to implement the aspects based on the description herein.

Further, certain portions may be implemented as "logic" that performs one or more functions. This logic may include hardware, such as an application-specific integrated circuit (ASIC) or a field-programmable gate array (FPGA), or a combination of hardware and software.

To the extent the aforementioned embodiments collect, store or employ personal information provided by individuals, it should be understood that such information shall be used in accordance with all applicable laws concerning protection" of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A computing node, comprising:
 a non-transitory computer-readable medium storing a set of processor-executable instructions; and
 one or more processors configured to execute the processor-executable instructions, wherein executing the processor-executable instructions causes the one or more processors to:
  receive, from a data repository device, a notification that configuration data stored by the data repository device has been changed, the configuration data defining a configuration of one or more processes hosted by the computing node as part of a distributed computing deployment;
  retrieve, in response to the notification and from the data repository device, the configuration data for the one or more processes;
  analyze the configuration data to determine a change in the configuration data;
  determine whether the change to the configuration data represents a change to the one or more processes hosted by the computing node;
  when it is determined that the change to the configuration data represents a change to the configuration of the one or more processes hosted by the computing node:
   create a canonical version of the configuration data; and
   reconfigure the one or more processes, hosted by the computing node, based on the canonical version of the configuration data; and
  when it is determined that the change to the configuration data does not represent a change to the processes hosted by the computing node:
   forgo creating the canonical copy of the configuration data; and
   forgo reconfiguring the one or more processes based on the configuration data.

2. The computing node of claim 1, wherein determining that the change to the configuration data does not represent a change to the processes hosted by the computing node includes determining that the change to the configuration data is limited to a change to the manner in which the configuration data is formatted within data repository.

3. The computing node of claim 1, wherein executing the processor-executable instructions causes the one or more processors to:
 detect a prompt to configure the processes hosted by the computing node, wherein the configuration data is retrieved based on detecting the prompt.

4. The computing node of claim 3, wherein the prompt to configure processes hosted by the computing node includes a utility service automatically executed by the computing node upon initialization of the computing node.

5. The computing node of claim 1, wherein the configuration of the hosted processes includes at least one software program, and a configuration thereof, to be automatically implemented by the computing node.

6. The computing node of claim 1, wherein the configuration data is first configuration data, wherein executing the processor-executable instructions, to determine whether the change to the configuration data represents a change to one or more processes hosted by the computing node, includes determining that that the change to the configuration data represents a change to the configuration of the one or more processes hosted by the computing node, wherein executing the processor-executable instructions further causes the one or more processors to:
 receive, from the data repository device, an additional notification of an additional change to configuration data currently stored by the data repository device;
 retrieve, in response to the additional notification and from the data repository device, second configuration data currently stored by the data repository device;
 compare the canonical version of the configuration data to the second configuration data to determine a difference between the canonical version of the configuration data to the second configuration data;
 associate the difference between the canonical version of the configuration data to the second configuration data with a current timestamp; and
 store the difference between the canonical version of the configuration data to the second configuration data and the timestamp associated thereto.

7. The computing node of claim 6, wherein executing the processor-executable instructions further causes the one or more processors to:
 receive, from an operator device, a request for a history of changes corresponding to the configuration data currently stored by the data repository; and
 provide, in response to the request from the operator device for the history of changes, the operator with:
  the canonical version of the configuration data and the timestamp associated thereto, and
  an indication of the difference between the canonical copy of the configuration data and the second configuration data.

8. The computing node of claim 7, wherein executing the processor-executable instructions causes the one or more processors to:
 receive, from the operator device, a request for the configuration data currently stored by the data repository; and
 provide, in response to the request for the configuration data currently stored by the data repository, the second configuration data.

9. A method, comprising:
 receiving, by a computing node and from a data repository device, a notification that configuration data stored by the data repository device has been changed, the configuration data defining a configuration of one or more processes hosted by the computing node as part of a distributed computing deployment;
 retrieving, by the computing node and in response to the notification and from the data repository device, the configuration data for the one or more processes;
 analyzing the configuration data to determine a change in the configuration data;
 determining whether the change to the configuration data represents a change to the one or more processes hosted by the computing node;
 when it is determined that the change to the configuration data represents a change to the configuration of the one or more processes hosted by the computing node:
  creating a canonical version of the configuration data; and
  reconfiguring the one or more processes, hosted by the computing node, based on the canonical version of the configuration data; and when it is determined that the change to the configuration data does not represent a change to the processes hosted by the computing node:
   forgoing creating the canonical copy of the configuration data; and
   forgoing reconfiguring the one or more processes based on the configuration data.

10. The method of claim 9, wherein determining that the change to the configuration data does not represent a change to the processes hosted by the computing node includes determining that the change to the configuration data is limited to a change to the manner in which the configuration data is formatted within data repository.

11. The method of claim 9, further comprising:
   detecting a prompt to configure the processes hosted by the computing node, wherein the configuration data is retrieved based on detecting the prompt.

12. The method of claim 11, wherein the prompt to configure processes hosted by the computing node includes a utility service automatically executed by the computing node upon initialization of the computing node.

13. The method of claim 9, wherein the configuration of the hosted processes includes at least one software program, and a configuration thereof, to be automatically implemented by the computing node.

14. The method of claim 9, wherein the configuration data is first configuration data, wherein determining whether the change to the configuration data represents a change to one or more processes hosted by the computing node includes determining that that the change to the configuration data represents a change to the configuration of the one or more processes hosted by the computing node, the method further comprising:
   receiving, from the data repository device, an additional notification of an additional to configuration data currently stored by the data repository device;
   retrieving, in response to the additional notification and from the data repository device, second configuration data currently stored by the data repository device;
   comparing the canonical version of the configuration data to the second configuration data to determine a difference between the canonical version of the configuration data to the second configuration data;
   associating the difference between the canonical version of the configuration data to the second configuration data with a current timestamp; and
   storing the difference between the canonical version of the configuration data to the second configuration data and the timestamp associated thereto.

15. The method of claim 14, further comprising:
   receiving, from an operator device, a request for a history of changes corresponding to the configuration data currently stored by the data repository; and
   providing, in response to the request from the operator for the history of changes, the operator with
      the canonical version of the configuration data and the timestamp associated thereto, and
      an indication of the difference between the canonical copy of the configuration data to the additional canonical copy of the configuration data and the timestamp associated thereto.

16. A non-transitory, computer readable medium storing a plurality of processor-executable instructions, wherein executing the processor-executable instructions causes one or more processors to:
   receive, from a data repository device, a notification that configuration data stored by the data repository device has been changed, the configuration data defining a configuration of one or more processes hosted by a computing node that is part of a distributed computing deployment;
   retrieve, in response to the notification and from the data repository device, the configuration data for the one or more processes;
   analyze the configuration data to determine a change in the configuration data;
   determine whether the change to the configuration data represents a change to the one or more processes hosted by the computing node;
   when it is determined that the change to the configuration data represents a change to the configuration of the one or more processes hosted by the computing node:
      create a canonical version of the configuration data; and
      reconfigure the one or more processes, hosted by the computing node, based on the canonical version of the configuration data; and
   when it is determined that the change to the configuration data does not represent a change to the processes hosted by the computing node:
      forgo creating the canonical copy of the configuration data; and
      forgo reconfiguring the one or more processes based on the configuration data.

17. The non-transitory memory device of claim 16, wherein determining that the change to the processes hosted by the computing node includes determining that the change to the configuration data is limited to a change to the manner in which the configuration information is formatted within data repository.

18. The non-transitory computer-readable medium of claim 16, wherein the configuration data is first configuration data, wherein the processor-executable instructions, to determine whether the change to the configuration data represents a change to one or more processes hosted by the computing node, include processor-executable instructions to determine that that the change to the configuration data represents a change to the configuration of the one or more processes hosted by the computing node, wherein the plurality of processor-executable instructions further include processor-executable instructions to:
   receive, from the data repository device, an additional notification of an additional change to configuration data currently stored by the data repository device;
   retrieve, in response to the additional notification and from the data repository device, second configuration data currently stored by the data repository device;
   compare the canonical version of the configuration data to the second configuration data to determine a difference between the canonical version of the configuration data to the second configuration data;
   associate the difference between the canonical version of the configuration data to the second configuration data with a current timestamp; and
   store the difference between the canonical version of the configuration data to the second configuration data and the timestamp associated thereto.

19. The non-transitory computer-readable medium of claim 18, wherein the plurality of processor-executable instructions further include processor-executable instructions to:
   receive, from an operator device, a request for a history of changes corresponding to the configuration data currently stored by the data repository; and provide, in response to the request from the operator device for the history of changes, the operator with:
  the canonical version of the configuration data and the timestamp associated thereto, and
  an indication of the difference between the canonical copy of the configuration data and the second configuration data.

20. The non-transitory computer-readable medium of claim 19, wherein the plurality of processor-executable instructions further include processor-executable instructions to:
  receive, from the operator device, a request for the configuration data currently stored by the data repository; and
  provide, in response to the request for the configuration data currently stored by the data repository, the second configuration data.

* * * * *